Dec. 14, 1943.　　J. F. TOPINKA　　2,336,818
CABLE TENSIONER
Filed March 4, 1943　　2 Sheets-Sheet 1
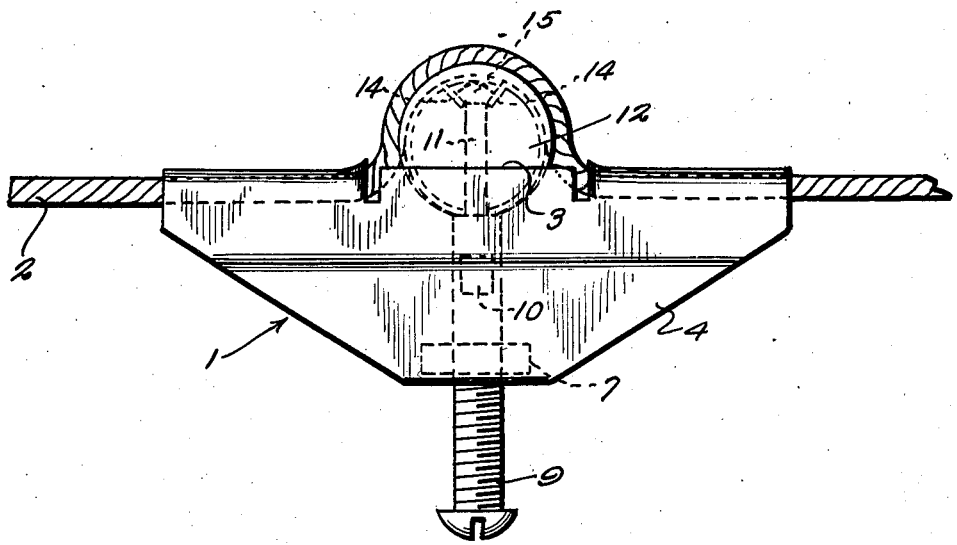
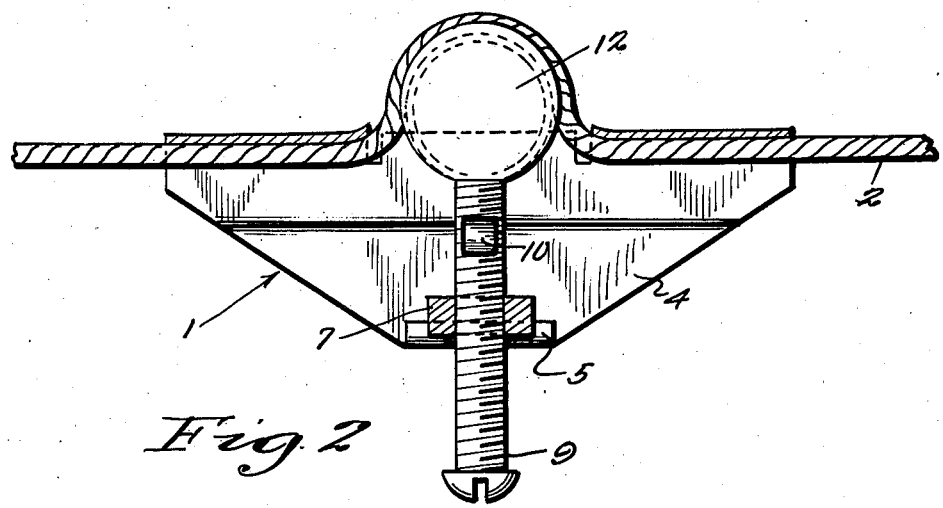
Inventor
Joseph F. Topinka
By Clarence A. O'Brien
and Harvey B. Jacobson
Attorneys Dec. 14, 1943.   J. F. TOPINKA   2,336,818
CABLE TENSIONER
Filed March 4, 1943   2 Sheets-Sheet 2
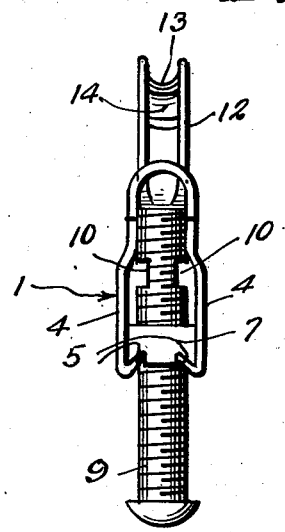
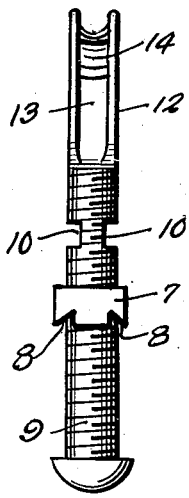
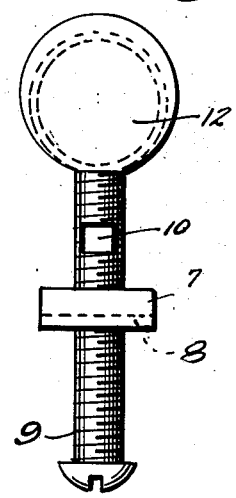
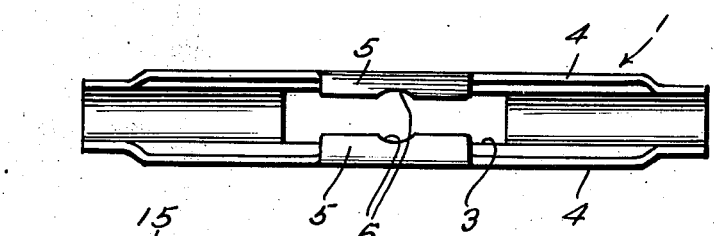
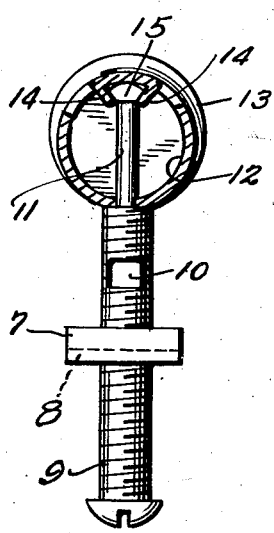
Inventor
Joseph F. Topinka
By Clarence A. O'Brien
and Harvey B. Jacobson
Attorneys Patented Dec. 14, 1943

2,336,818

UNITED STATES PATENT OFFICE 2,336,818

CABLE TENSIONER

Joseph F. Topinka, Cleveland, Ohio

Application March 4, 1943, Serial No. 478,048

2 Claims. (Cl. 24—71)

The present invention relates to new and useful improvements in cable tensioners to be used in lieu of turnbuckles, and has for its primary object to provide, in a manner as hereinafter set forth, novel means for tightening a cable without the necessity of cutting or splicing same.

Another very important object of the invention is to provide a cable tensioner of the aforementioned character which is adapted to be applied to the cable at any desired point.

Other objects of the invention are to provide a cable tensioner of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing a cable tensioner constructed in accordance with the present invention in use.

Figure 2 is a view in longitudinal section therethrough.

Figure 3 is a view in end elevation of the device.

Figure 4 is a bottom plan view of the channel member.

Figure 5 is an elevational view of the tensioning device.

Figure 6 is an elevational view of the tensioning device, taken at right angles to Figure 5.

Figure 7 is a side elevational view of the tensioning device, substantially similar to Figure 6, but showing the saddle in vertical section.

Referring now to the drawings in detail, it will be seen that the embodiment of the invention which has been illustrated comprises a channel member which is designated generally by reference numeral 1, said channel member being of any suitable material, preferably metal. The channel member 1, which is of substantially the shape shown to advantage in Figure 1 of the drawing, is adapted to be slipped on the cable to be tensioned or tightened, as at 2. The bight portion of the channel member 1 has formed therein a longitudinally elongated opening 3. The sides 4 of the channel member 1 have formed on their longitudinal edges inturned, acutely angled flanges 5. As best seen in Figure 4 of the drawings, the flanges 5 have formed therein opposed notches or recesses 6.

An elongated nut or block 7 is slidably inserted in the channel member 1 and rests on the flanges 5. The nut 7 has formed therein grooves or channels 8 for the reception of the flange 5. A screw 9 is threadedly mounted in the nut 7, said screw including reduced, flattened side portions 10, the purpose of which will be presently set forth.

Projecting from the inner end of the screw 9 is a headed pin 11. A substantially circular, hollow saddle 12 is swiveled on the pin 11, said saddle including a peripheral channel 13 for the reception of the cable 2. Fingers 14 are struck inwardly from the periphery of the saddle 12 and are engaged beneath the head 15 of the pin 11 for rotatably securing said saddle on said pin.

It is thought that the manner in which the device is used will be readily apparent from a consideration of the foregoing. Briefly, with the members 7, 9, 12, et cetera, removed therefrom, the channel member 1 is mounted on the cable 2. The nut 7 is then slipped longitudinally on the flanges 5 between the sides 4 of the channel member 1, the flattened side portions or notches 10 in the screw 9 accommodating said flanges and permitting said screw to pass therebetween. The screw 9 is then given a quarter turn for engaging said screw in the notches or recesses 6, thereby retaining the nut against longitudinal sliding movement on the flanges 5. The swivelly mounted saddle 12 is peripherally engaged with the cable 2 and the screw 9 is tightened for forcing said saddle, together with said cable, outwardly through the opening 3 in the manner clearly shown in Figure 2 of the drawings.

It is believed that the many advantages of a cable tensioner constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A cable tensioner comprising a channel member adapted to be mounted longitudinally on a cable, said channel member having an opening in its bight portion, inturned flanges on the sides of the channel member, a nut mounted in the channel member on said flanges, a screw threadedly mounted in said nut for advance and retraction, and a substantially circular saddle swivelly mounted on the screw and engageable with the cable for forcing said cable outwardly through the opening, said nut being slidable onto and off of said flanges when the screw is retracted and locked on said flanges by said screw when the screw is advanced.

2. A cable tensioner comprising a channel member adapted to be mounted longitudinally on a cable, said channel member having a longitudinally elongated opening in its bight portion, inturned flanges on the sides of the channel member, a nut slidably mounted on the flanges for removal therefrom, a screw threadedly mounted in the nut and removable therewith, a pin on said screw, and a substantially circular saddle rotatably mounted on the pin and engageable with the cable for forcing said cable outwardly through the opening.

JOSEPH F. TOPINKA.